US008473774B2

(12) United States Patent
Hikabe

(10) Patent No.: US 8,473,774 B2
(45) Date of Patent: Jun. 25, 2013

(54) MAIN DEVICE REDUNDANCY CONFIGURATION AND MAIN DEVICE REPLACING METHOD

(75) Inventor: Akinori Hikabe, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 333 days.

(21) Appl. No.: 12/110,389

(22) Filed: Apr. 28, 2008

(65) Prior Publication Data

US 2008/0288686 A1    Nov. 20, 2008

(30) Foreign Application Priority Data

May 18, 2007  (JP) .................................. 2007-132955

(51) Int. Cl.
*G06F 11/00* (2006.01)
(52) U.S. Cl.
USPC ............................................................ 714/3
(58) Field of Classification Search
USPC ..................................................... 714/3, 4, 6
See application file for complete search history.

(56) References Cited

U.S. PATENT DOCUMENTS

| 5,255,388 | A | * | 10/1993 | McLaughlin et al. ................. 1/1 |
| 5,774,668 | A | * | 6/1998 | Choquier et al. .............. 709/223 |
| 6,243,826 | B1 | * | 6/2001 | Quoc et al. ......................... 714/4 |
| 6,643,795 | B1 | * | 11/2003 | Sicola et al. ....................... 714/6 |
| 6,928,503 | B1 | | 8/2005 | Mosgrove |
| 6,954,436 | B1 | * | 10/2005 | Yip et al. ........................ 370/254 |
| 6,983,362 | B1 | * | 1/2006 | Kidder et al. ..................... 713/1 |
| 6,990,606 | B2 | * | 1/2006 | Schroiff et al. ................... 714/7 |
| 7,188,273 | B2 | * | 3/2007 | Allen et al. ....................... 714/6 |
| 7,197,660 | B1 | * | 3/2007 | Liu et al. .......................... 714/4 |
| 7,243,253 | B1 | * | 7/2007 | McClary et al. ............... 713/500 |
| 7,293,192 | B2 | * | 11/2007 | Allen et al. ....................... 714/6 |
| 7,483,370 | B1 | * | 1/2009 | Dayal et al. ................... 370/219 |
| 7,668,923 | B2 | * | 2/2010 | Herring et al. ................ 709/209 |
| 7,984,117 | B2 | * | 7/2011 | Yook et al. .................... 709/220 |
| 8,203,933 | B2 | * | 6/2012 | Taylor et al. .................. 370/217 |
| 8,291,148 | B1 | * | 10/2012 | Shah et al. ..................... 710/316 |
| 8,295,162 | B2 | * | 10/2012 | Soon et al. .................... 370/225 |
| 2002/0032809 | A1 | | 3/2002 | Bateman et al. |

(Continued)

FOREIGN PATENT DOCUMENTS

| JP | 04-281548 | 10/1992 |
| JP | 4-339492 | 11/1992 |

(Continued)

OTHER PUBLICATIONS

Canadian Office Action issued Dec. 6, 2011 by the Canadian Intellectual Property Office in counterpart Canadian Patent Application No. 2630125, 6 pages.

(Continued)

*Primary Examiner* — Amine Riad
(74) *Attorney, Agent, or Firm* — Young & Thompson

(57) ABSTRACT

A networking system architecture includes a plurality of main devices, one of the main devices acts as a master main device, and the other main devices act as slave main devices. If the master main device malfunctions, one of the slave main devices substitutes for the master main device to act as a new master main device. Priorities are set to the main devices, respectively. If a current master main device malfunctions, the current master main device may be replaced by a new master main device having the highest priority among the other main devices.

18 Claims, 17 Drawing Sheets

U.S. PATENT DOCUMENTS

| | | | |
|---|---|---|---|
| 2002/0046271 A1* | 4/2002 | Huang | 709/223 |
| 2004/0001485 A1* | 1/2004 | Frick et al. | 370/389 |
| 2004/0085965 A1 | 5/2004 | Fotedar | |
| 2004/0260976 A1* | 12/2004 | Ji et al. | 714/31 |
| 2004/0260977 A1* | 12/2004 | Ji et al. | 714/36 |
| 2005/0015657 A1* | 1/2005 | Sugiura et al. | 714/6 |
| 2006/0203725 A1 | 9/2006 | Paul et al. | |
| 2009/0279549 A1* | 11/2009 | Ramanathan et al. | 370/395.4 |
| 2010/0198718 A1* | 8/2010 | Morosan et al. | 705/37 |
| 2011/0116362 A1* | 5/2011 | Singatwaria | 370/216 |
| 2011/0191622 A1* | 8/2011 | Goto et al. | 714/4.2 |
| 2012/0218901 A1* | 8/2012 | Jungck et al. | 370/241 |

FOREIGN PATENT DOCUMENTS

| | | |
|---|---|---|
| JP | 05-108687 | 4/1993 |
| JP | 7-168790 | 7/1995 |
| JP | 11-331174 | 11/1999 |
| JP | 11-353284 | 12/1999 |
| JP | 2001-043105 | 2/2001 |
| JP | 2001-358736 | 12/2001 |
| JP | 2003-345407 | 12/2003 |
| JP | 2005-244602 | 9/2005 |
| WO | 9735255 | 9/1997 |
| WO | 01/25934 | 4/2001 |

OTHER PUBLICATIONS

JP Office Action dated Nov. 24, 2011, with English Translation.
JP Office Action dated Jun. 5, 2012, with English translation; Application No. 2008-119018.
Japanese Official Action—2008-130780—Mar. 27, 2013.
ASCII Corporation—"Easy setting of network devices—there exists now UPnP", Network Magazine, vol. 7, No. 10, Japan, Oct. 1, 2002, pp. 72-75.

* cited by examiner

FIG.8

| PHYSICAL SLOT | VIRTUAL SLOT |
|---|---|
| SYSTEM 1, SLOT 1 | SLOT 1 |
| SYSTEM 1, SLOT 2 | SLOT 2 |
| SYSTEM 2, SLOT 1 | SLOT 3 |
| SYSTEM 3, SLOT 1 | SLOT 4 |
| SYSTEM 3, SLOT 2 | SLOT 5 |
| | |

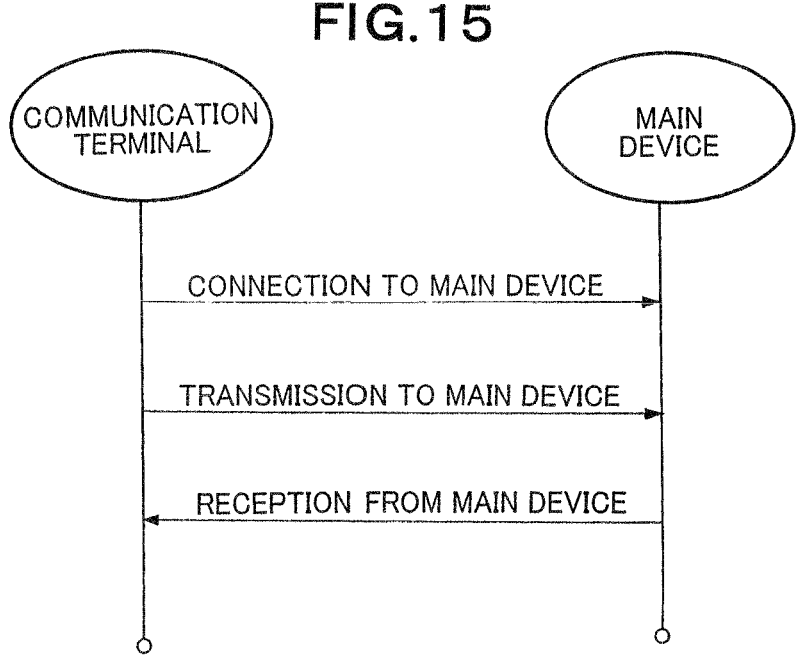

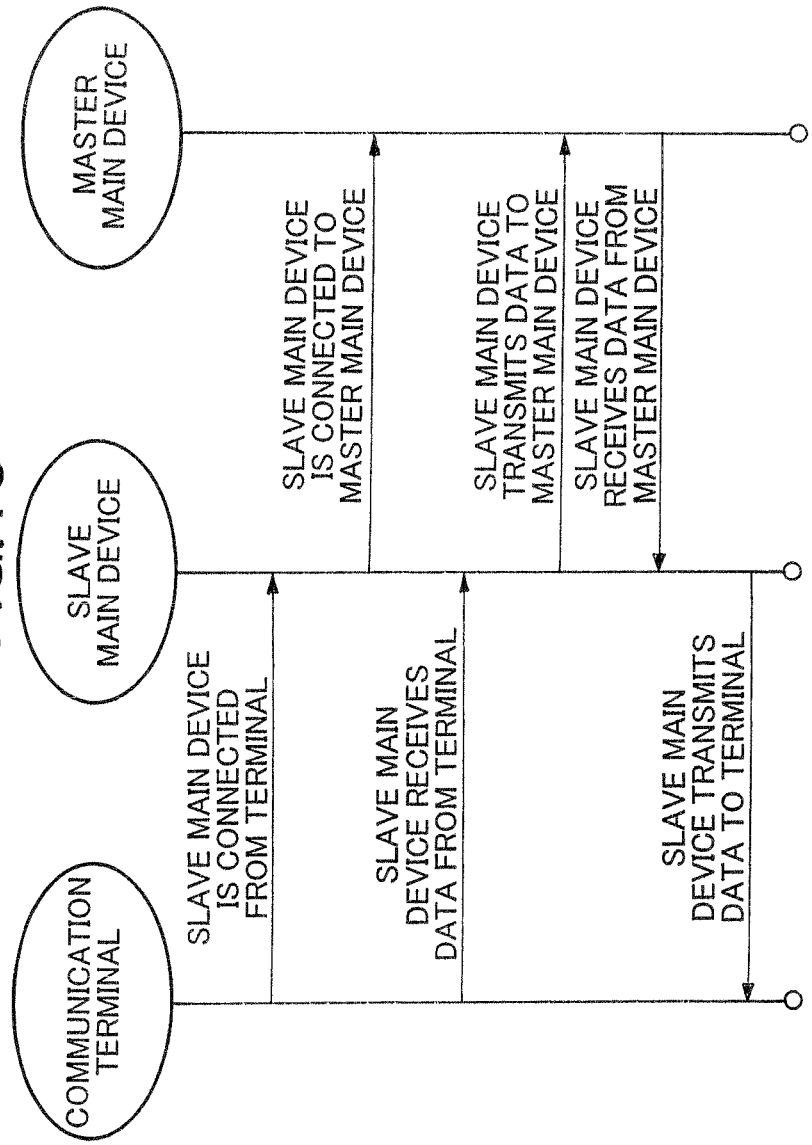

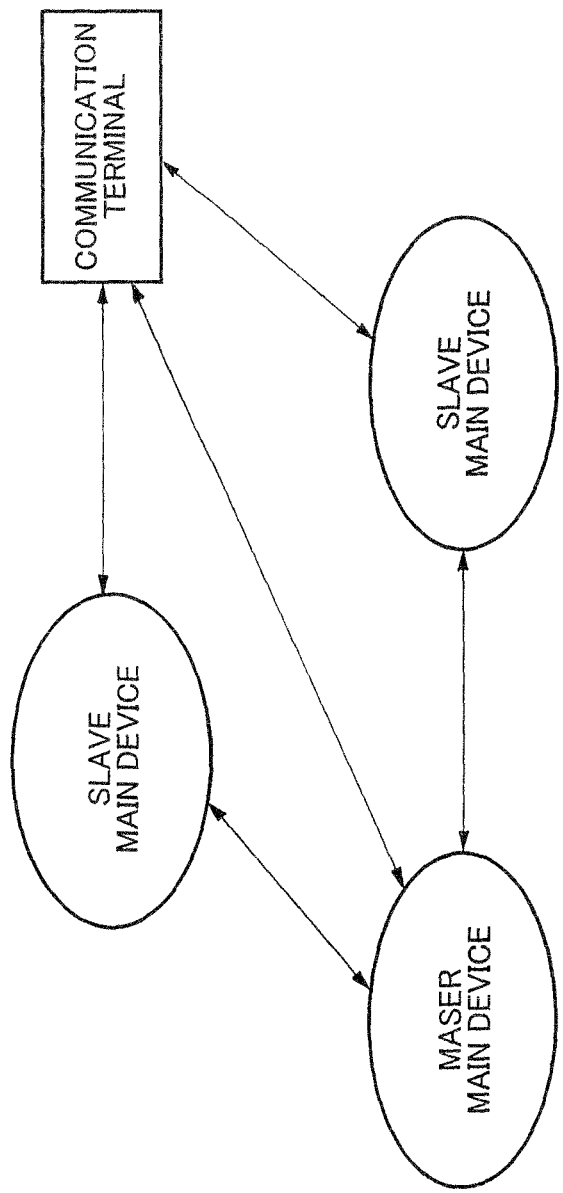

US 8,473,774 B2

MAIN DEVICE REDUNDANCY CONFIGURATION AND MAIN DEVICE REPLACING METHOD

RELATED APPLICATIONS

This application is based on and claims the benefit of priority from Japanese patent application No. 2007-132955, filed on May 18, 2007, the disclosure of which is incorporated herein in its entirety by reference.

BACKGROUND OF THE INVENTION

1. Field of the Invention

The present invention relates to a main device redundancy configuration for allowing another main device to act as a substitute master main device if a plurality of main devices are arranged and one main device acting as a master malfunctions, and a main device replacing method.

2. Description of the Related Art

There is conventionally known a technique for connecting main devices to one another by a network and for allowing each of the main devices to use functions of the other main devices. The "main device" means herein a device that includes an interface for accommodating a terminal (e.g., a button telephone), an interface connecting the main device to a public line, and an interface connecting the main device to an IP network.

However, to enable the main devices to mutually use functions of the others via the network, it is necessary to alternate their functions, respectively. The non-alternated functions are not compliant with the network, so that the other main devices are incapable of using all functions of a certain main device via the network.

Namely, with the conventional technique, in the architecture of networking connection among the main devices, CPUs of the main devices manage resources, respectively and manage states of terminals, lines and the like separately. Due to this, to enable each of the main devices to actuate the functions of the other main devices via the network is not so simple as actuating its own functions but it is disadvantageously necessary to alter the functions so as to be compliant with the network.

Furthermore, in case of conventional networking systems, the systems manage slots for packages that are resources of each main device separately. Due to this, each system is unable to know information, states, and the like of resources of the other systems. As a result, restrictions are imposed on use of functions of the other main devices on the network.

An object of a reference embodiment to be described below is to construct a networking system architecture that can facilitate managing information and that is free from restrictions to functions by allowing one main device to integrally manage information such as resources of hardware of all main devices connected to one another by a network.

The gist of the reference embodiment lies in a technique for allowing each main device to handle resources on the network as if they are its own resources.

In the main device operating under program control, hardware resource management, that is, management of terminals, lines and the like is made in the form of package management.

Therefore, to allow each main device to handle resources on the network as if they are its own resources, it suffices that the main device handles packages on the network as if they are its own packages.

FIG. 1 is a conceptual diagram of package management on the network.

If a package is installed into a main device 2, information on the package and information on a terminal, a line and the like connected to the package are transmitted to a main device 1 via the Ethernet (registered trademark).

On the main device 2 side, since these pieces of information are not transmitted to a package control unit or a call control unit of the main device 2, it does not appear to the main device 2 that a situation changes.

On the main device 1 side, since a lower layer processes data transmitted from the main device 2 and it appears as if the information arrives from a slot of the main device 1, it appears to the main device 1 that the package is input to the slot of the main device 1.

Furthermore, as for a command to the package (downstream data), a lower layer of the main device 1 processes the downstream data and transmits a command to a virtual package to a real package on the network.

By introducing this mechanism, it is possible for each main device to handle resources on the network as if they are its own resources.

Therefore, a higher layer of each main device such as the call control unit can freely use resources without knowledge that the resources are present on the network.

FIG. 2 is a configuration diagram of the networking system architecture according to the reference embodiment.

A main device managing all the resources on the network and exerting all call controls is referred to as "master".

A main device connected to the master, providing package information to the master, and obeying commands from the master is referred to as "slave".

To establish the networking system architecture according to the reference embodiment, it is necessary that one of a plurality of main devices constituting the network acts as a master. All slaves are connected to the master, obey commands from the master, and do not perform any processings such as call control. Namely, even if a slave includes a functional unit performing call control or the like, the unit is in a dormant state.

The master can control a plurality of slaves and can handle resources of the main devices connected to the master as slaves as if they are all its own resources.

The networking system architecture constituted by the master and the slaves can thereby act as if it is one system.

It is necessary to set, in advance, information as to which main device acts as a master or a slave and information as to by which IP address each of the main devices is connected to the master.

The main device set as the master awaits connection from the slaves and each of the slaves establishes connection to a preset IP address of the mater.

In this way, after the connection between the master and the slaves is established, transmission of package information and the like are performed and the networking system architecture operates as one system.

If the master goes down, all the main devices connected to the master become unavailable. To prevent this problem, if the master goes down, one of a plurality of slaves acts as a master to execute roles of the master for the original master (Redundancy Function).

It is necessary to set, in advance, information as to which slave substitutes for the master if the master goes down.

A specific method for central control over resources on the network will next be described.

FIG. 3 shows a system configuration on the networking system architecture.

Only one master is present on the network and controls all slaves.

To identify each system on the network, the systems are given unique system IDs, respectively.

FIG. 4 is a conceptual diagram of slot management according to the reference embodiment.

Packages are physically installed into slots of each of the systems connected to the network and having the system ID. Information on the packages is unitarily integrated into a virtual slot database and the master system manages the virtual slot database.

The master controls slots while referring to this virtual slot database.

If slots belong to the system other than the master, the slots are present physically at a remote location connected to the master by an IP network. However, the master can handle the slots as if they are its own slots without knowledge that the physical slots are at remote locations.

Therefore, the master can handle terminals and lines connected to the packages installed into the slots as if they are terminals and lines connected to the master.

FIG. 5 shows the systems representing the above-stated manners.

Packages connecting terminals, packages accommodating therein lines connected to a public line, and packages accommodating therein IP lines connected to the IP network are installed into a system having system ID: 1, a system having system ID: 2, and a system having system ID: 3, respectively.

Since physical slots of these systems are managed as virtual slots in the virtual slot database, each of the systems can freely control the terminals, lines and the like accommodated in the packages connected to the slots as if they are its own terminals, lines and the like.

By adopting the resource management method, even the systems distributed on the network can use functions of the other systems without restrictions.

As shown in FIG. 3, the systems shown in FIG. 5 are built on a client-server architecture in which one master controls slaves. The master performs call processings on all the main devices including the master and manages a database. The master also manages virtual slots.

The systems are connected to one another according to an internet protocol (IP) and given system IDs unique to the systems, respectively.

The systems 1, 2, and 3 include packages accommodating therein terminals, packages accommodating therein ordinary lines, and packages accommodating therein IP lines, respectively.

The virtual slot database manages information on these packages. While the master basically manages the data, each of the slaves holds the same data in case of replacement of the master.

The example shown in FIG. 5 will be additionally described from viewpoints of data flow.

FIG. 6 shows data flow for conventional package control.

As shown in FIG. 6, upstream data from a package is transmitted from a slot I/F module 101 to a CAPS (call control module)/OPMS (package and terminal management module) 105 via an IOCS (input/output control module) 103.

The CAPS/OPMS 105 processes the upstream data and transmits a downstream command to the slot I/F module 101 via the IOCS 103. For example, if a package is installed into a slot, then data is transmitted to the CAPS/OMPS 105 as upstream data, and the CAPS/OMPS 105 recognizes package installation and exercises a starting control over the package, i.e., permits the package to be active. If a terminal connected to the package installed into the slot is off the hook, the slot I/F module 101 transmits data indicating that the terminal is off the hook to the CAPS/OPMS 105 as upstream data. In response to the upstream data, the CAPS/OPMS 105 transmits a command to produce a dial tone from the terminal to the slot I/F 101 via the IOCS 103 as downstream data.

In FIG. 6, the data from the slot I/F 101 is directly transmitted to the higher module as input data, so that the system concerned can naturally control only the slot connected to the system.

FIG. 7 shows data flow according to the reference embodiment.

As shown in FIG. 7, in the reference embodiment, slot management by networking is realized by additionally providing slot control modules 107 each controlling slot input/output and a slot management module 109 managing slot information.

Upstream data from one slot is subjected to a temporary spooling by one of the slot control modules 107 corresponding to a system including the slot and then transmitted to the slot management module 109 of the master controlling the system. If the system is the master, the upstream data is transmitted to its own slot management module 109. The management module 109 exercises such a control that it appears to the IOCS 103 that is a higher module that the data transmitted to the slot management module 109 is transmitted from a certain slot.

Operation performed by the slot management module 109 will be described in more detail with reference to a table of FIG. 8.

If the slot management module 109 receives data from a specific slot of a certain system and the specific slot is a slot of the system that has not been recognized so far, the slot management module 109 newly assigns a virtual slot number to the slot and subsequently regards the slot of the system as the slot to which the virtual slot number is assigned.

For example, if upstream data is transmitted from a slot 1 of a system 1 and the slot 1 is the slot that has not been recognized so far, a virtual slot number 1 is assigned to the slot 1.

In this manner, if virtual slot numbers are newly assigned to slots so as to act as virtual slots, respectively, a physical slot/virtual slot contrast table 111 as shown in FIG. 8 is created.

Thereafter, the higher module such as the IOCS 103 or the CAPS/OPMS 105 regards the data transmitted from the slot 1 of the system 1 as data from its own slot 1 even without knowledge of the network.

If downstream data is to be actually transmitted to a slot to issue a command to hardware, the command is issued to a slot of an appropriate system while referring to the physical slot/virtual slot contrast table 111.

The command is transmitted to the slot control modules 107 of the systems and commands are transmitted to actual packages of the systems, respectively.

In this manner, by introducing the modules 107 and 109 controlling or managing slots on the network, there is no need to have knowledge of the network during most parts of the processings performed by the main devices, and it is possible to control hardware as if the module controls the system corresponding to the module.

Differently from hardware limitation on the number of physical slots, no limitation is set to the number of virtual slots but an unlimited number of virtual slots can be assigned as long as a memory of each system can afford.

Generally, in each of the systems, processings are performed using virtual slot numbers. However, in parts visible to a user, such as setting of system data, it is often desired to perform a processing while identifying by which slot in which system the processing is performed.

In that case, settings and the like can be made using physical slots while referring to the physical slot/virtual slot contrast table 111.

The reference embodiment solves many of the conventional problems by attaining the central control networking system architecture so as to avoid problems with a distributed networking system architecture.

At the same time, however, the reference embodiment disadvantageously bears system vulnerability. Namely, according to the reference embodiment, from the nature of the reference embodiment, one main device acting as the master (hereinafter, "master main device") exercises central control over all the resources on the network and manages all the main devices acting as slaves (hereinafter, "slave main devices"). Due to this, if the master main device malfunctions due to some failure, all the slave main devices connected to the master main device malfunction accordingly, with the result that the entire network malfunctions.

SUMMARY OF THE INVENTION

The present invention is an improvement of the reference embodiment. It is an object of the present invention to improve robustness of an entire networking system architecture in case of such failures as network malfunctioning by providing redundancy to the networking system architecture.

According to one aspect of the present invention, there is provided a main device redundancy configuration including a plurality of main devices, one of the main devices acting as a master main device, remaining main devices other than the master main device acting as slave main devices, wherein if the master main device malfunctions, one of the slave main devices substitutes for the master main device to act as a new master main device.

In the main device redundancy configuration, priorities are set to the main devices, respectively, and the main device having the highest priority among the main devices acts as the new master main device if the current master main device malfunctions.

In the main device redundancy configuration, if one of the main devices compares the priorities of all the other main devices with the priority of one of the main devices and the priority of one of the main devices is higher than the priorities of all the other main devices, then one of the main devices acts as the master main device and notifies the other main devices that one of the main devices is the master main device in response to inquiries from the other main devices, and if each of the other main devices receives a notification indicating that one of the main devices acts as the master main device, each of the other main devices recognizes that each of the other main devices is one of the slave main devices.

In the main device redundancy configuration, the slave main devices other than the master main device hold system data held by the master main device.

In the main device redundancy configuration, a communication between a terminal and the master main device is held via one of the slave main devices.

According to the present invention, it is possible to avoid the problem of the vulnerability of the central control networking system architecture that the entire network malfunctions if a main device acting as a master malfunctions.

This is an important and indispensable function particularly for a system such as a telephone used for mission critical business.

BRIEF DESCRIPTION OF THE DRAWINGS

FIG. 8 shows a specific example of a physical slot/virtual slot contrast table according to the reference embodiment;

FIG. 15 is a conceptual diagram showing conventional communication between a communication terminal and a main device;

FIG. 16 is a conceptual diagram showing communication between the communication terminal and the main device according to the second embodiment of the present invention; and FIG. 17 is a schematic diagram showing that the communication terminal can be connected to any main device according to the second embodiment of the present invention.

DETAILED DESCRIPTION OF THE INVENTION

Embodiments of the present invention will be described hereinafter in detail with reference to the accompanying drawings.

First Embodiment

In a first embodiment of the present invention, if a main device acting as a master main device malfunctions, then a main device to substitute for the master main device is selected from among slave main devices connected to the master main device, and the selected main device operates as a new master main device, thereby avoiding the conventional problems.

Namely, if the master main device malfunctions, then slave main devices connected to the master main device sense that the master main device malfunctions, and a new main device to substitute for the master main device is selected from among all the slave main devices according to preset priorities. The slave main device that has been changed to the new or substitute master main device starts operating as the master main device and controls all the slave main devices. By introducing this mechanism, even if the master main device malfunctions, the entire network does not malfunction but can keep operating, thereby improving system robustness.

In the first embodiment, if a master main device (system) malfunctions in the central control networking system architecture, then the new or substitute master main device is uniquely selected based on priorities set to the main devices, respectively, and the selected main device succeeds to functions of the master main device.

Figure 9:
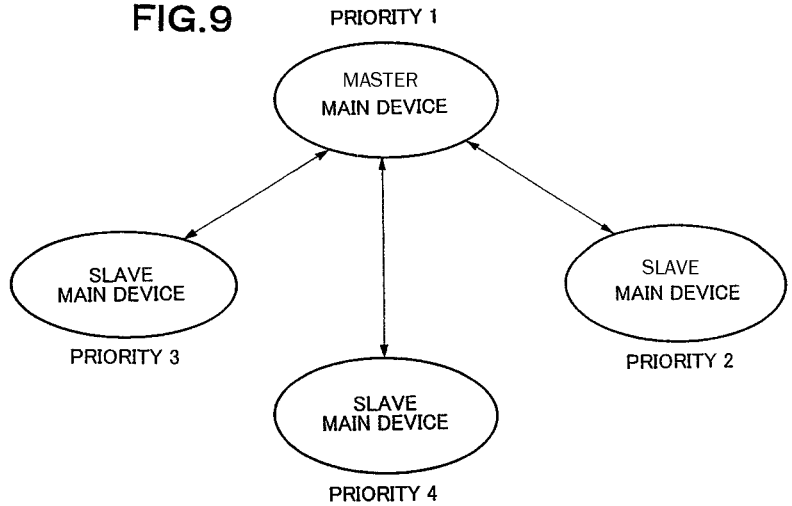
FIG. 9 is a first diagram showing a connection relation between a master main device and slave main devices according to a first embodiment of the present invention.
Figure 10:
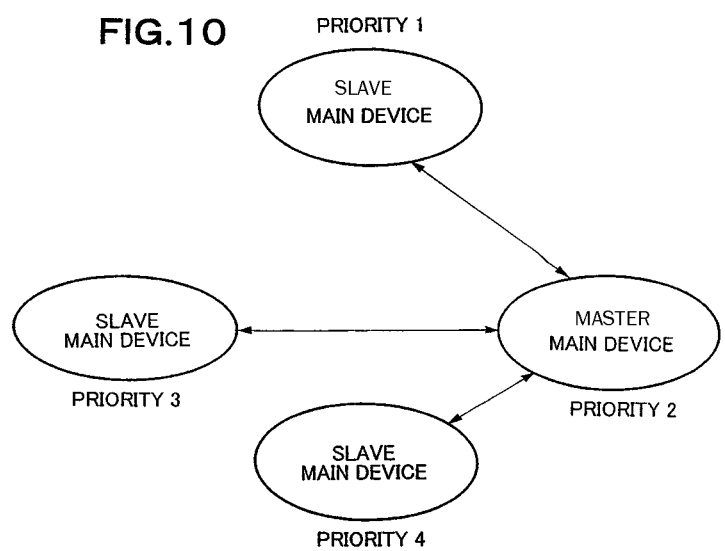
FIG. 10 is a second diagram showing the connection relation between the master main device and the slave main devices according to the first embodiment of the present invention.

FIGS. 9 and 10 are conceptual diagrams of the networking system architecture according to the first embodiment of the present invention.

In FIGS. 9 and 10, each arrow indicates a communication relation and bidirectional communication is always held between the master main device and each of the slave main devices.

If the master main device malfunctions or communication breaks down for such a reason as a network failure, then the master main device is replaced by another main device, and a state changes from a state shown in FIG. 9 to a state shown in FIG. 10.

In FIGS. 9 and 10, each ellipse represents a main device and a master main device priority is set to each main device as system data. During occurrence of a failure, the main device having the highest master main device priority is selected from among all the operating main devices as the substitute master main device and starts operating as the main device. Furthermore, IP addresses are set to all the main devices, respectively.

Each of the slave main devices always monitors connection to the master main device. If a communication with the master main device cannot be held for predetermined time or longer, then it is determined that the master main device malfunctions or a network failure occurs, and selection of the substitute master main device starts.

The substitute master main device is selected by causing each main device to inquire all the other main devices about their priorities. The inquiry is made by sending a specific packet to the other main devices (expressed by IP addresses) on the IP in a list.

Each of the main devices receiving this specific package transmits its priority to the sender main device.

Figure 11:
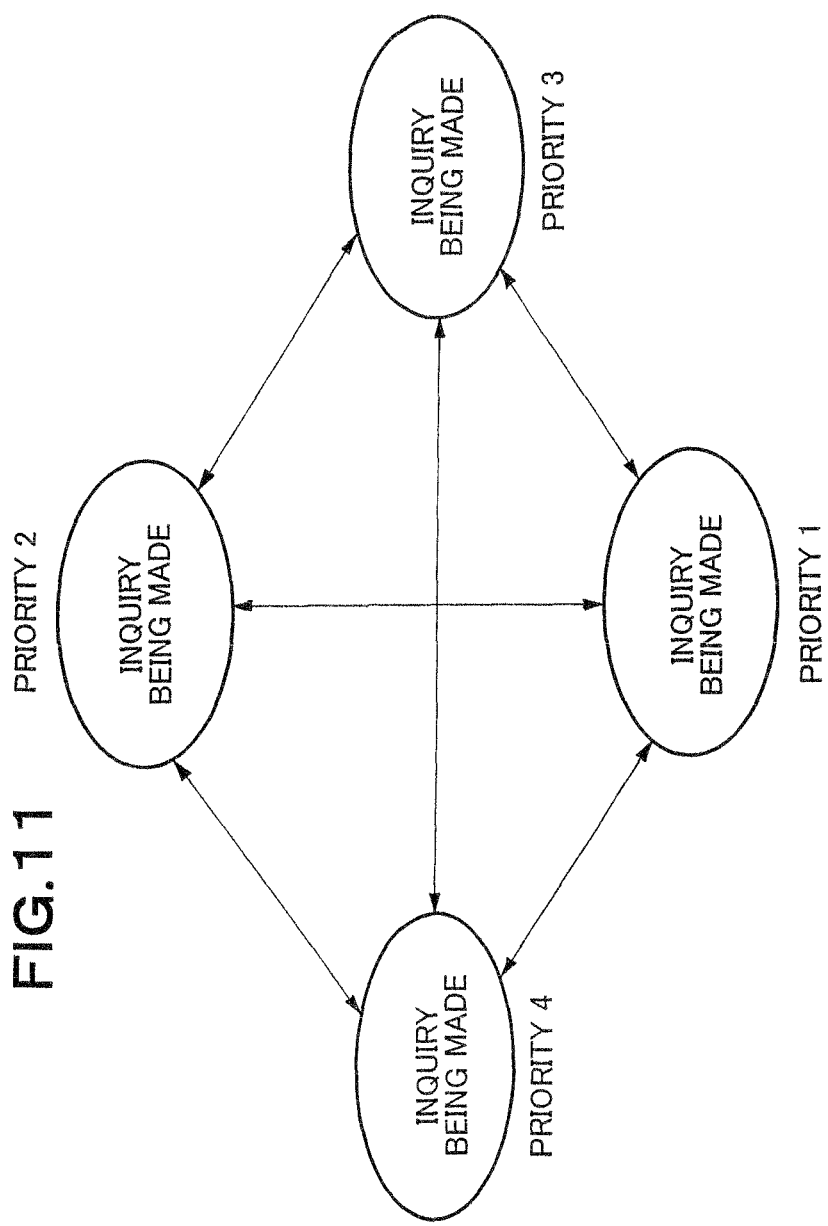
FIG. 11 is a conceptual diagram showing priority inquiries among the main devices according to the first embodiment of the present invention.

FIG. 11 is a conceptual diagram of the priority inquiry.

In FIG. 11, each ellipse represents a main device which is being inquired about the priority, and each arrow represents that an inquiry is being made. As shown in FIG. 11, the priority inquiry is made as a round robin.

If one of the main devices receives responses from all the other main devices in the list owned by the main device and the main device has the highest priority, the main device starts operating as the master main device. The main device from which no response is transmitted after passage of certain time is considered to malfunction, and the main device receiving the responses from the other main devices determines which has the highest priority.

If the main device inquiring the other main devices about their priorities is determined as the master main device, the main device notifies all the other main devices that the main device acts as the master main device from this time on.

Meanwhile, the main devices having lower priorities keep transmitting inquiries until the main device having the highest priority becomes the master main device. The main device acting as the master main device starts operating as the master main device while the main devices having the lower priority keep transmitting the inquiries. Due to this, each of the main devices having the lower priorities receives a response from the new master main device indicating that the main device acts as the master main device. After receiving the response, the other main devices are connected to the master main device that has transmitted the response and start operating as slave main devices.

The above-stated flow continues until each of the main devices becomes the master main device or the slave main device. By repeating this flow, the master main device having the highest priority can be uniquely selected and a new network centering around the selected master main device can be created.

The main devices are connected to one another by an IP network and have unique IP addresses and master main device priorities, respectively. Each of the main devices also includes a list of all the other main devices constituting the network. To identify each main device from the other main devices, the main devices have unique IDs, respectively. The IDs will be referred to as "system IDs" hereinafter. The system IDs can be considered to be identical to the respective master main device priorities.

Figure 12:
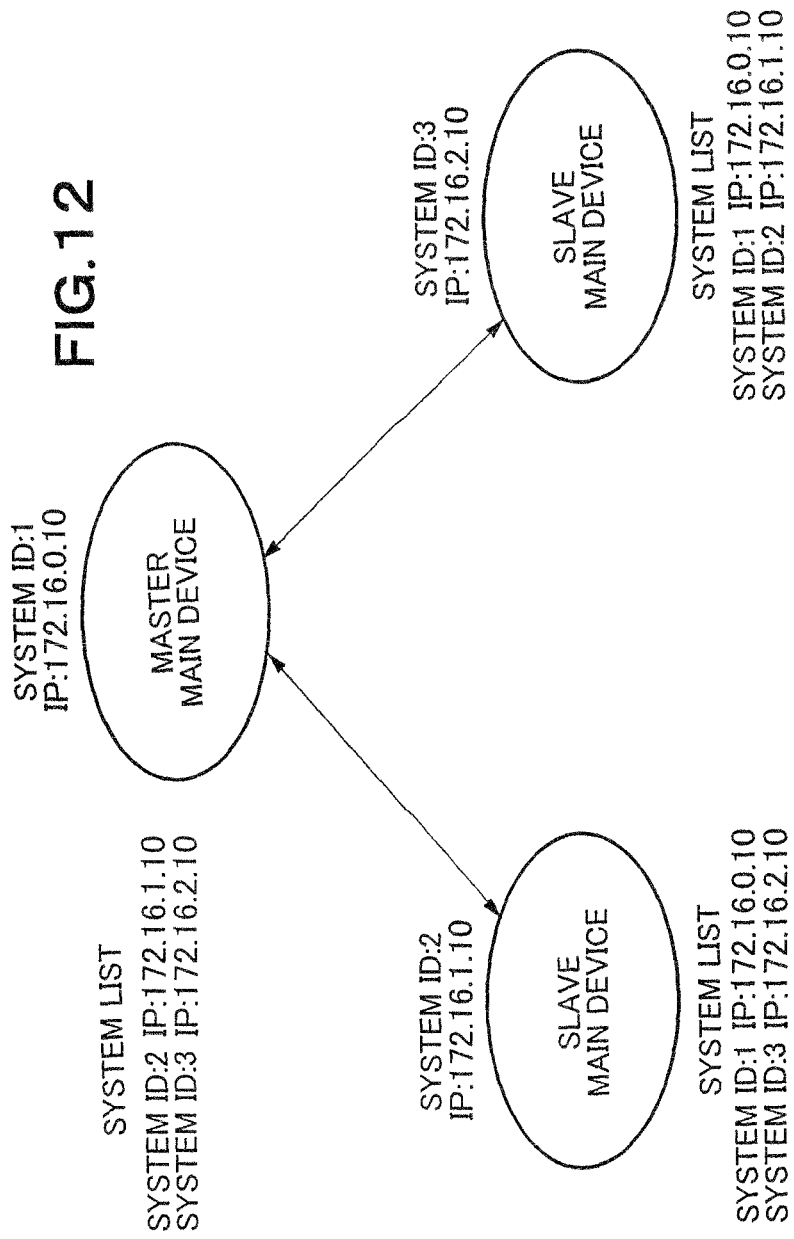
FIG. 12 is a third diagram showing the connection relation between the master main device and the slave main devices according to the first embodiment of the present invention.

FIG. 12 is a configuration diagram of the networking system architecture according to the first embodiment.

As shown in FIG. 12, the main devices are uniquely given the IP addresses and the system IDs, respectively, and hold, as data, information on the IP addresses and the system IDs of the other main devices.

If the master main device malfunctions or the master main device is not decided yet during construction of the network, the master main device is decided based on the information on the IP addresses and the system IDs.

By adopting the above-stated method, it is possible to select the substitute master main device and allow the network to at least keep operating. However, this method is insufficient to allow the network to operate without losing any functions of the main devices. A method for making up the deficiencies will next be described.

1. Synchronization of System Data

Each of the main devices holds setting information on a telephone, a line, and the like as a file called "system data".

In the central control networking system architecture, the master main device manages information on all the slave main devices and operates. Due to this, the master main device refers to the system data held by the slave main devices.

Accordingly, if the master main device is changed over to another main device, the main device acting as the new or substitute master main device refers to its own system data. Due to this, the main devices that may possibly act as the master main device need to hold the same system data as that of the system currently acting as the master main device.

To realize this, the central control networking system architecture introduces a mechanism in which latest system data is always synchronously transmitted to the slave master devices under control of the master main device whenever the master main device updates the system data.

2. Forced Changeover of Master Main Device

In the above-stated master main device replacing method, if connection to the master main device cannot be held for certain time, then the slave devices consider that a failure occurs to the master main device, and the master main device is automatically replaced by another main device. However, the network is often reset for such reasons as a change in settings of the systems. In that case, it is desired to return the master main device to the original master main device.

Moreover, which main device acts as the master main device depends on an order of rising at the time of initial construction of the network systems. This method is unfavorable if it is desired to allow a specific main device to act as the master main device.

Therefore, a function of forcedly setting the master main device is provided.

The forced setting of the master main device is made by designating the system ID of the main device that is to act as the master main device. For example, if a certain telephone terminal depresses a specific number (e.g., #999) and the system ID, the main device having the depressed system ID is forced to act as the master main device.

This operation can be made by whichever system terminal connected to the network.

If this operation is made, the master main device can determine which system ID is the system ID of the new master main device. Therefore, the master main device acquires the IP address of the new master main device from the list of IP addresses held by the master main device, and transmits a command to the effect that a destination of the command is the master main device, to the new master main device as a packet.

The main device having received this command starts operating as the master main device and notifies all the main devices that the master main device has been changed over.

Second Embodiment

In the first embodiment, the resource central control networking system architecture includes the redundancy function, whereby the master main device controlling the entire network can be changed over and the system robustness is improved.

The first embodiment has, however, the following problems. The mater main device is replaced by another master device and communication terminals such as an external CTI (Computer Telephony Integration) server and an ACD-MIS (Automatic Call Distributor-Management Information System) cannot communicate with the main master device that replaces the original communication partner. Due to this, these communication terminals cannot hold communication with the new master main device. Moreover, the communication terminals such as the external CTI server and the ACD-MIS need to be informed which main device on the network acts as the master main device in advance.

The second embodiment avoids the problems with the first embodiment by causing the main devices other than the master main device to transfer (redirect) communication from the communication terminals such as the CTI server and the ACT-MIS to the master main device.

Namely, if the main device that recognizes connection from a communication terminal is not the master main device, that is, is the slave main device, then the main device redirects the connection from the communication terminal to the master main device to which the main device is connected. Further, the main device transfers data from the communication terminal to the master main device and relays data from the master main device to the communication terminal.

By doing so, it appears to the communication terminal that the communication terminal communicates with the master main device and it appears to the master main device that the master main device communicates with the communication terminal.

Therefore, there is no need for the communication terminal to have knowledge of the changeover of the master main device and to have knowledge as to which main device on the network acts as the master main device.

On the master main device side, since it appears that the master main device is connected to the communication terminal as before, there is no need to change processings.

The second embodiment will be described in more detail with reference to the drawings.

Figure 13:
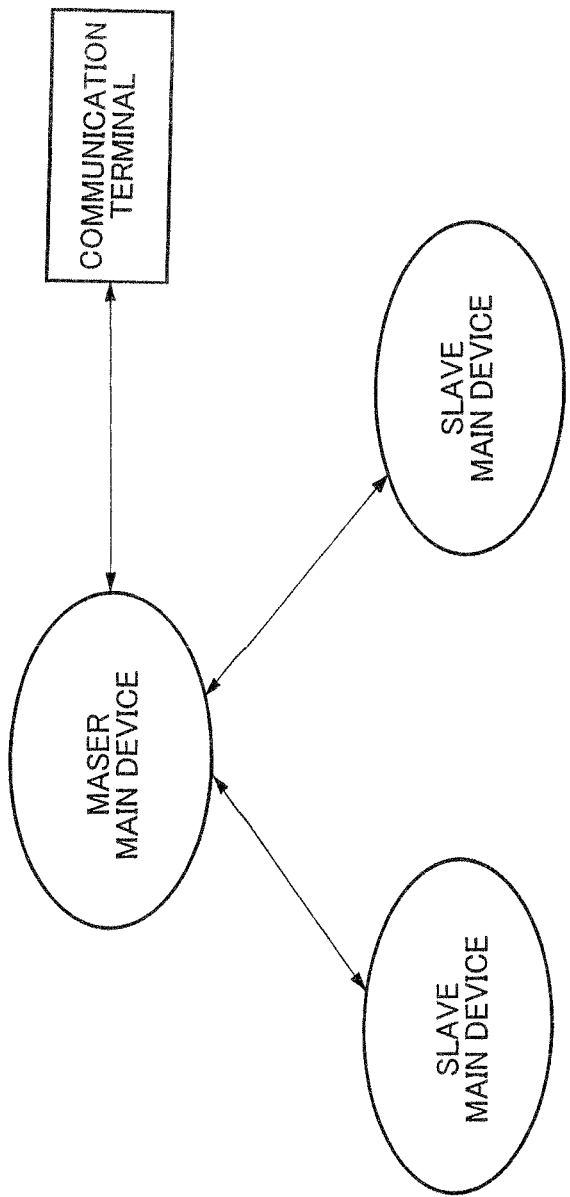
FIG. 13 is a conceptual diagram of connection of the master main device to a communication terminal in a resource central control networking system architecture according to a second embodiment of the present invention.

FIG. 13 is a conceptual diagram of connection of the master main device to the communication terminal in the resource central control networking system architecture according to the second embodiment.

On the network, only one master main device responsible for all call controls and resource management is present. The main devices acting as slave main devices communicate with the master main device and entirely obey commands from the master main device.

The communication terminal communicates with the master main device according to the preset IP address, acquires call information, controls the main devices, and does the other things.

Figure 14:
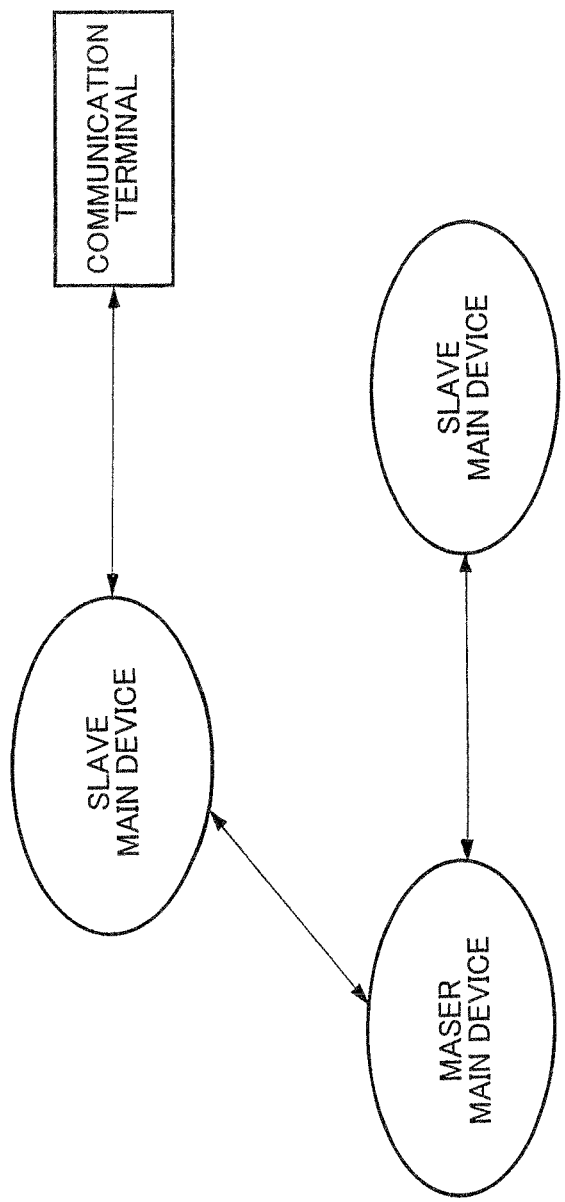
FIG. 14 is a diagram showing a connection relation among the communication terminal, the master main device and the slave main devices if the master main device is replaced by another main device according to the second embodiment of the present invention.

If a communication breaks down or the system goes down, the master main device is replaced by another main device using the redundancy function. FIG. 14 is a conceptual diagram showing this state.

At this time, the main device that has acted as the slave main device is changed to the master main device and the main device that has acted as the master main device is changed to a slave main device. However, since the communication terminal is only configured to communicate with a single main device, the communication terminal has no choice but to communicate with the communication partner that has acted as the master main device before.

However, the communication partner is not already the master main device but the slave main device obeying commands from the master main device. Due to this, the communication partner can communicate with the communication terminal but cannot transmit appropriate information to the communication terminal.

The second embodiment, therefore, provides a technique for relaying the connection to the communication terminal so that it appears to the communication terminal that the communication terminal directly communicates with the new master main device and to the new master main device that the new master main device directly communicates with the communication terminal.

Figure 1:
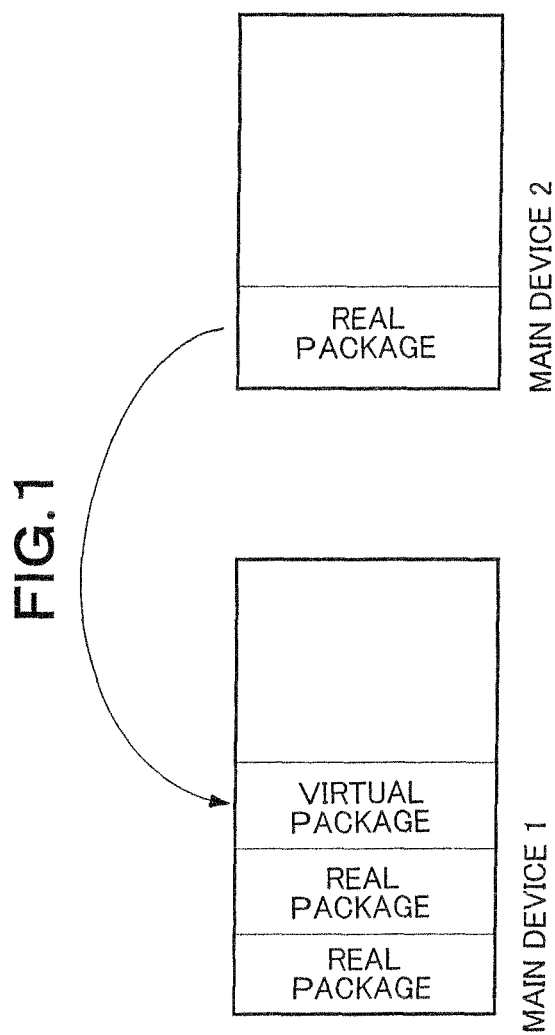
FIG. 1 is a conceptual diagram showing a manner in which one main device handles a real package of the other main device as a real package of one main device using a virtual package according to a reference embodiment.
Figure 2:
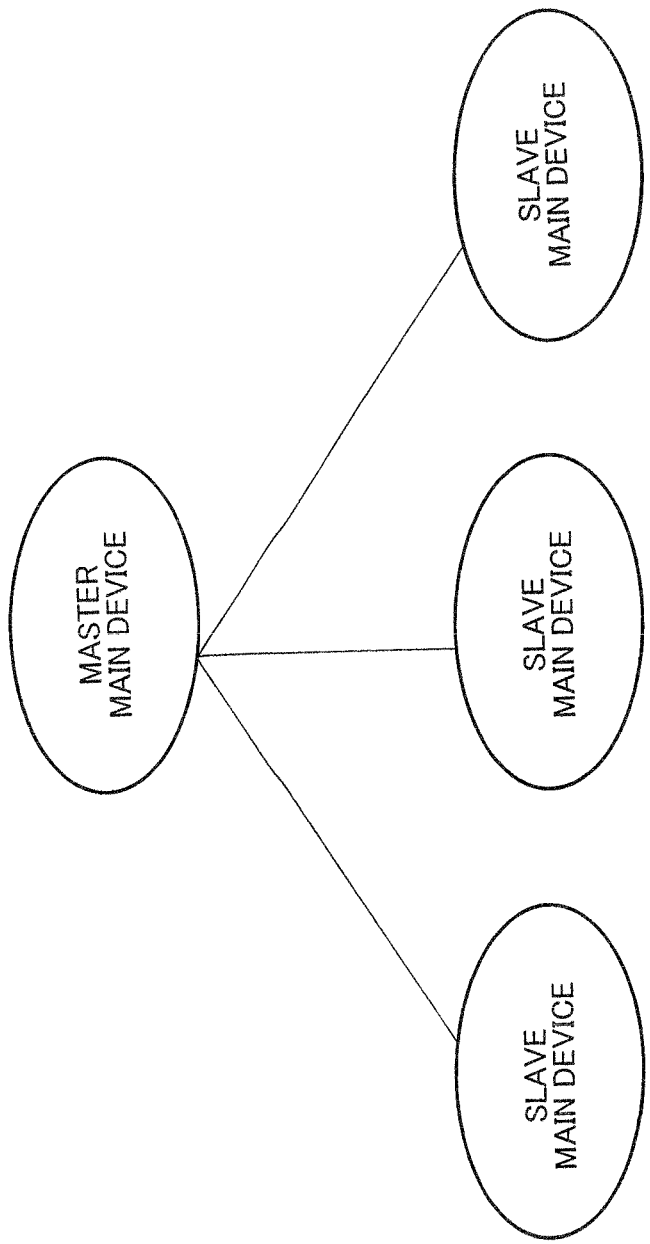
FIG. 2 is a conceptual diagram showing an example of connection among a master main device and slave main devices according to the reference embodiment.
Figure 3:
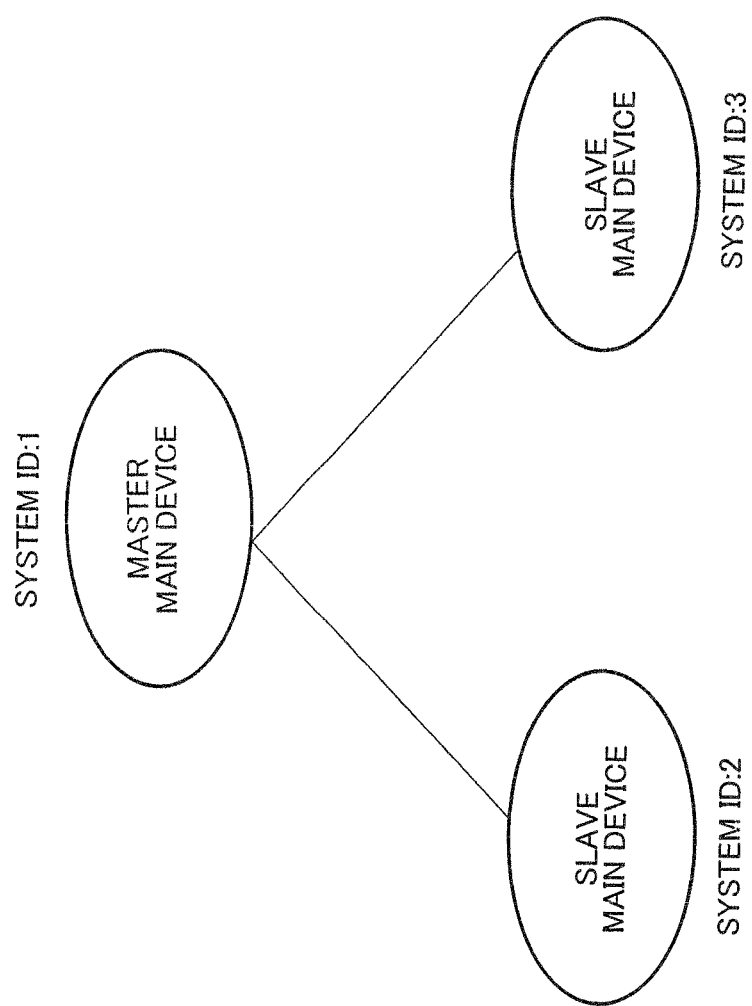
FIG. 3 is a conceptual diagram showing another example of connection among the master main device and the slave main devices according to the reference embodiment.
Figure 4:
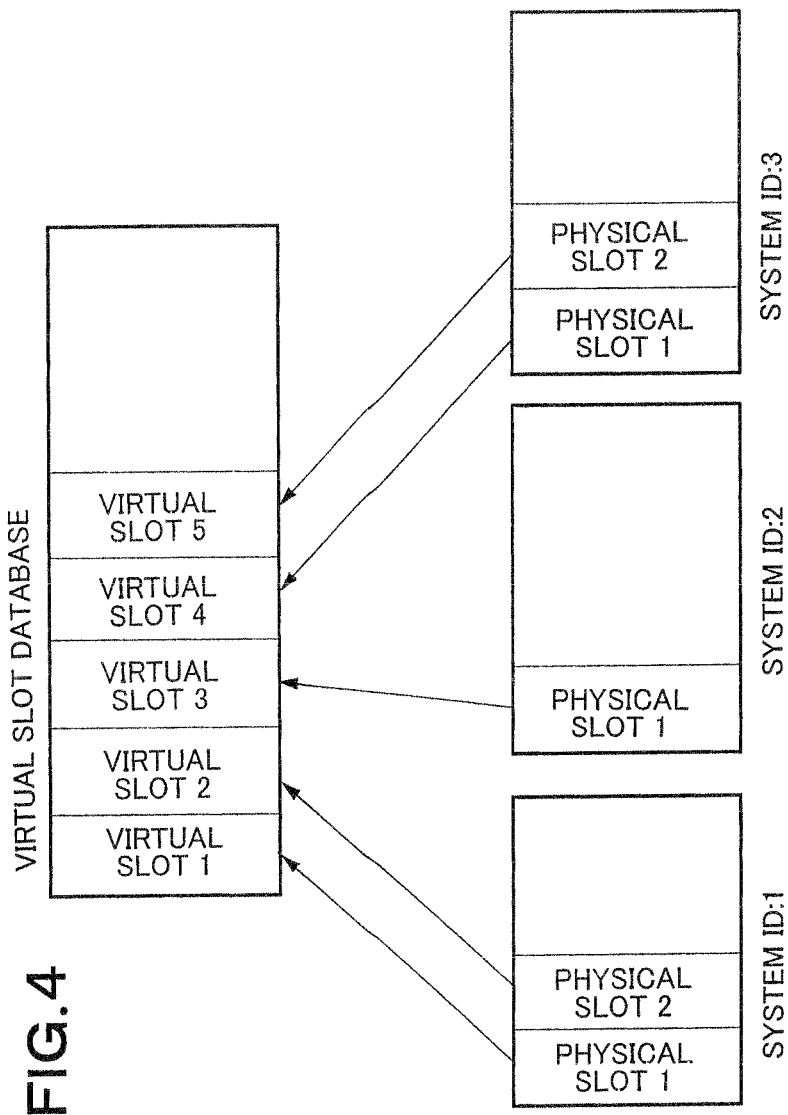
FIG. 4 is a conceptual diagram showing correspondence between virtual slots and physical slots according to the reference embodiment.
Figure 5:
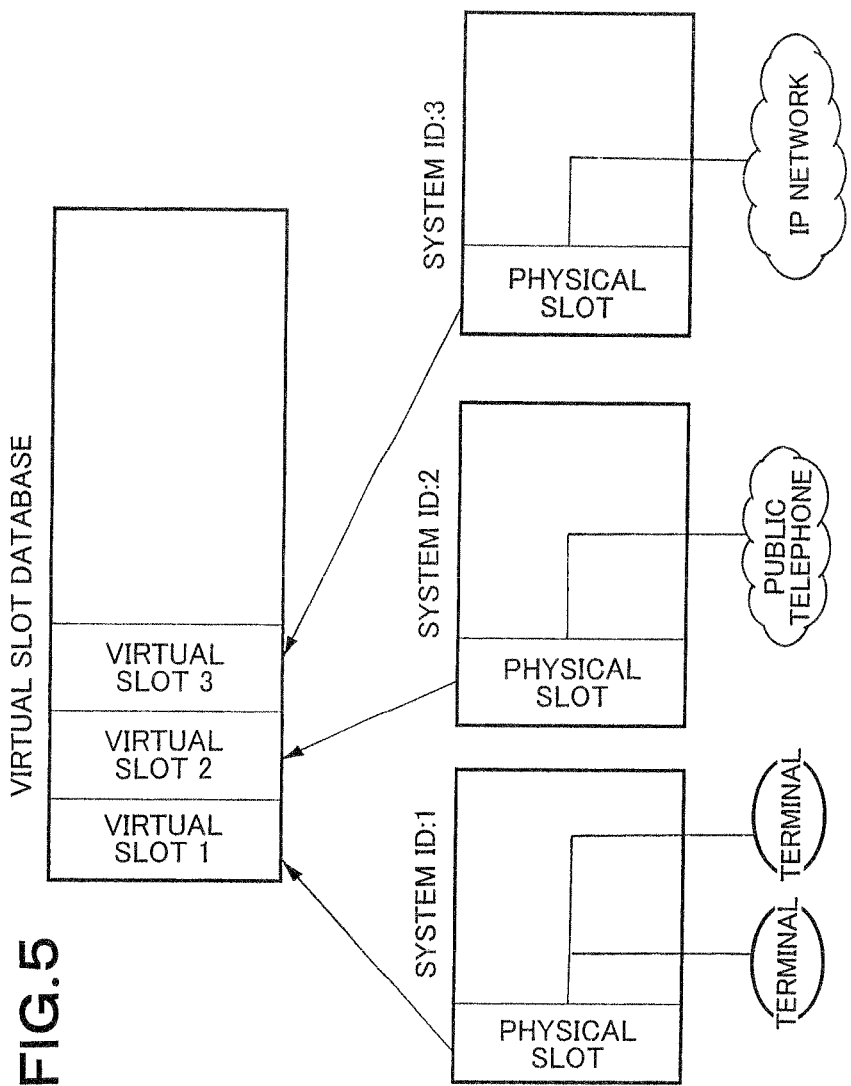
FIG. 5 is a schematic diagram showing correspondence between the virtual slots and the physical slots and showing an example of connection destinations of the respective physical slots according to the reference embodiment.
Figure 6:
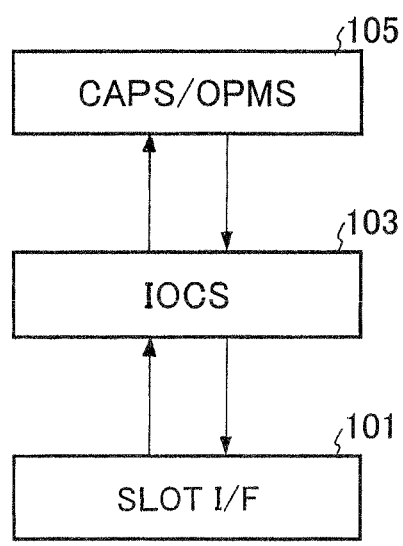
FIG. 6 is a schematic diagram showing a connection relation among CAPS/OPMS, IOCS, and a slot interface according to the reference embodiment.
Figure 7:
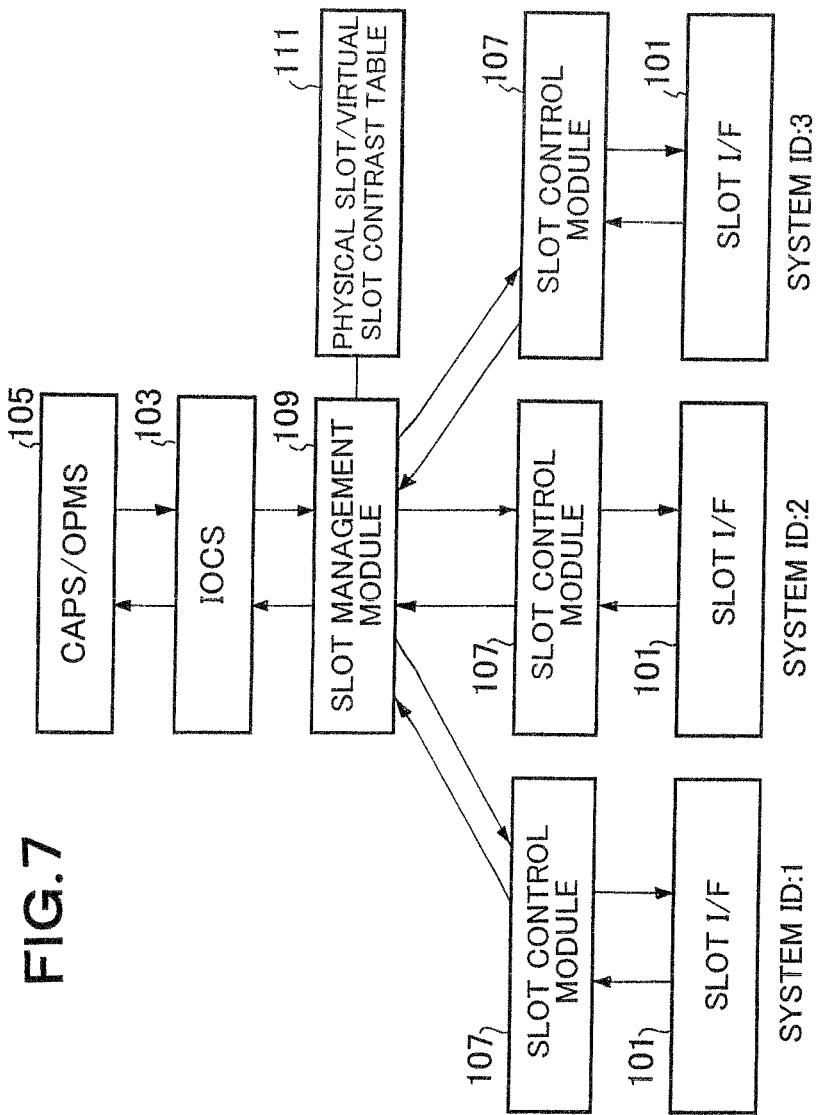
FIG. 7 is a schematic diagram showing a connection relation among the CAPS/OPMS, the IOCS, a slot management module, a physical slot/virtual slot contrast table, slot control modules, and the slot interface according to the reference embodiment.

In the configuration diagram shown in FIG. 2, the main devices are connected to one another by the internet protocol and the master main device and each of the slave main devices communicate with each other. While the master main device manages all of the call information, the resource information, and the system information, each of the slave main devices basically includes only the communication function and cannot directly perform appropriate processings on the communication terminal.

Moreover, the communication terminal can be connected only to a specific main device.

Actual operation according to the second embodiment will be additionally described.

FIG. 15 is a conceptual diagram showing conventional communication between a communication terminal and a main device.

The main device opens a specific port set based on system data for connection to or from the communication terminal, and awaits the connection at the specific port.

The communication terminal establishes connection to an IP address and the port of the main device.

The connection is held by an application of the communication terminal and the IP address and port of the main device need to be set in advance.

For example, if CTI is to be made, the main device prepares a CTI communication port 8000 (not shown) and awaits connection. The communication terminal starts a CTI application, sets the IP address and the communication port 8000 of the main device, and connects to the main device.

Further, the communication terminal transmits a command to the main device by transmitting data to the main device, and obtains a result by receiving data from the main device.

FIG. 16 is a conceptual diagram showing communication according to the second embodiment.

If one main device receives connection from the communication terminal and the main device is not the master main device but the slave main device, the main device is connected to the master main device while keeping the connection from the communication terminal.

At this time, system data synchronization is ensured between the master main device (former slave main device) and the slave main device (former master main device). Due to this, the slave main device can await the connection from the communication terminal at the same port as that of the master main device and can connect the communication terminal to a waiting port of the master main device.

The master main device that has received the connection from the slave main device recognizes that the connection is the connection from the communication terminal and starts services. On the communication terminal side, the communication terminal recognizes that the communication terminal has been connected to the master main device by the connection to the slave main device and starts operating.

Thereafter, the slave main device transfers data from the communication terminal to the master main device and transfers data from the master main device to the communication terminal. By doing so, wherever the master main device is actually located, the communication terminal can communicate with the master main device without knowledge of the location of the master main device at all.

Accordingly, even if the application of the communication terminal is manufactured by the third party, the application can be used without any problems. Moreover, since the master main device can recognize that the communication terminal is connected to the master main device as before, there is no need to change processings.

As shown in FIG. 17, the communication terminal can communicate with the master main device whichever the communication terminal is connected to. It, therefore, suffices to register one of the main devices on the network to the communication terminal as a connection destination and there is no need to have knowledge of which acts as the master main device.

By the use of the present invention, the problem that the communication terminal cannot be connected to the new master main device due to the changeover of the master main device can be avoided using the redundancy function. Besides, it is possible to guarantee the same operations for the communication terminal and the master main device as before, so that there is no need to change applications.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

What is claimed is:

1. A networking system, comprising:
a plurality of main devices, one of the main devices acting as an original master main device, and remaining main devices acting as slave main devices,
wherein the original master main device manages all hardware resources installed in the plurality of main devices on a network and exerts all call controls on the network,
wherein the system selectively performs one of a first changeover operation and a second changeover operation; in the first changeover operation, each of the slave main devices always monitors a communication connection to the master main device, and determines that the original master main device malfunctions, when the communication connection with the master main device cannot be held for a predetermined time, and then one of the slave main devices, having a highest priority, substitutes for the original master main device to act as a new master main device; and in the second changeover operation, a main device specified by an ID is forcedly set to act as the master main device, and
wherein when the slave main device having acted as the original master main device recognizes connection from a terminal that is set to communicate with the original master main device according to a preset IP address, the slave main device redirects the connection from the terminal to the new master main device by transferring data from the terminal to the new master main device, and relaying data from the new master main device to the terminal.

2. The networking system according to claim 1,
wherein priorities are respectively set to the main devices, and a main device having a highest priority acts as the new master main device when the master main device malfunctions.

3. The networking system according to claim 2, wherein,
one of the main devices compares a priority thereof with priorities of other main devices, and when the priority of the one of the main devices is higher than the priorities of the other main devices, the one of the main devices acts as the new master main device and issues a notification that the one of the main devices is the new master main device, and
when each of the other main devices receives the notification, the main device recognizes that the main device itself is one of the slave main devices.

4. The networking system of claim 1, wherein,
the main devices hold system data respectively,
the system data is in a format of a file,
the master main device refers to the system data of the slave main devices, and
latest system data being synchronously transmitted to the slave master devices under control of the master main device.

5. The networking system of claim 1, wherein,
the main devices hold system data respectively,
the system data is in a format of a file,
the master main device refers to the system data of the slave main devices,
latest system data being synchronously transmitted to the slave master devices under control of the master main device, and
each of the slave main devices always monitors a communication connection to the master main device, when a communication connection with the master main device cannot be held for predetermined time, selection of a substitute master main device starts.

6. A main device replacing method for the networking system, comprising a plurality of main devices, one of the main devices acting as an original master main device, and remaining main devices acting as slave main devices, wherein the original master main device manages all hardware resources installed in the plurality of main devices on a network and exerts all call controls on the network, the method comprising the step of:
selectively performing one of a first changeover operation and a second changeover operation, wherein in the first changeover operation, each of the slave main devices always monitors a communication connection to the master main device, and determines that the original master main device malfunctions, when the communication connection with the master main device cannot be held for a predetermined time, and then one of the slave main devices, having a highest priority, substitutes for the original master main device to act as a new master main device; and in the second changeover operation, a main device specified by an ID is forcedly set to act as the master main device, and
wherein when the slave main device having acted as the original master main device recognizes connection from a terminal that is set to communicate with the original master main device according to a preset IP address, the slave main device redirects the connection from the terminal to the new master main device by transferring data from the terminal to the new master main device, and relaying data from the new master main device to the terminal.

7. The main device replacing method for the networking system according to claim 6, wherein,
priorities are respectively set to the main devices, and
a main device having a highest priority acts as the new master main device when the master main device malfunctions.

8. The main device replacing method for the networking system according to claim 7, wherein,
one of the main devices compares a priority thereof with priorities of other main devices, and when the priority of the one of the main devices is higher than the priorities of the other main devices, the one of the main devices acts as the new master main device and issues a notification that the one of the main devices is the new master main device, and
when each of the other main devices receives the notification, the main device recognizes that the main device itself is one of the slave main devices.

9. The main device replacing method of claim 6, comprising the further steps of:
synchronously transmitting latest system data to the slave master devices under control of the master main device; and
when the master main device malfunctions, causing one of the slave main devices to substitute for the master main device to act as a new master main device.

10. The main device replacing method of claim 6, wherein,
i) said step of determining that the master main device has malfunctioned includes the sub-steps that
each of the slave main devices monitors a communication connection to the original master main device,
when the communication connection with the original master main device cannot be held for predetermined time by any one slave main device, the one slave device determines that the original master main device has malfunctioned, and
ii) said causing one of the slave main devices to substitute for the original master main device to act as a new master main device includes the sub-steps of
causing each slave main device to send a priority inquiry to all other slave main devices about their priorities, each inquiry being made by sending a specific packet to the other slave main devices, expressed by IP addresses, wherein,
each of the slave main devices receiving the inquiry transmits a response with its priority back to the slave main device sending the priority inquiry,
each slave main device, after receiving responses from all the other slave main, makes a determination as to which slave main device has the highest priority, the main device determined to have the highest priority being selected as the new master main device and sending a notification to all other main devices of acting as the new master main device from this time on, and
the slave main devices having lower priorities continues to transmit inquiries until receiving the notification of the new master main device being active.

11. A networking system, comprising:
a plurality of main devices, one of the main devices acting as an original master main device, and remaining main devices acting as slave main devices,
wherein the original master main device manages all hardware resources installed in the plurality of main devices on a network and exerts all call controls on the network,
wherein the system selectively performs one of a first changeover operation and a second changeover operation; in the first changeover operation, each of the slave main devices always monitors a communication connection to the master main device, and determines that the original master main device malfunctions, when the communication connection with the master main device cannot be held for a predetermined time, and then one of the slave main devices, having a highest priority, substitutes for the original master main device to act as a new master main device; and in the second changeover operation, a main device specified by an ID is forcedly set to act as the master main device,
wherein in the second changeover operation, a terminal is connected to one of the main devices and designates a main device in accordance with predetermined operation, and the main device designated by the terminal is forced to act as the new master main device, and
wherein when the slave main device having acted as the original master main device recognizes connection from a terminal that is set to communicate with the original master main device according to a preset IP address, the slave main device redirects the connection from the terminal to the new master main device by transferring data from the terminal to the new master main device, and relaying data from the new master main device to the terminal.

12. The networking system according to claim 11, wherein priorities are respectively set to the main devices, and a main device having a highest priority acts as the new master main device when the master main device malfunctions.

13. The networking system according to claim 12, wherein, one of the main devices compares a priority thereof with priorities of other main devices, when the priority of the one of the main devices is higher than the priorities of the other main devices, the one of the main devices acts as the new master main device and issues a notification that the one of the main devices is the new master main device, and when each of the other main devices receives the notification, the main device recognizes that the main device itself is one of the slave main devices.

14. The networking system of claim 11, wherein, the main devices hold system data respectively, the system data is in a format of a file, the master main device refers to the system data of the slave main devices, and latest system data being synchronously transmitted to the slave master devices under control of the master main device.

15. A main device replacing method for the networking system, comprising a plurality of main devices, one of the main devices acting as an original master main device, and remaining main devices acting as slave main devices, wherein the original master main device manages all hardware resources installed in the plurality of main devices on a network and exerts all call controls on the network, the method comprising the step of:

selectively performing one of a first changeover operation and a second changeover operation, wherein in the first changeover operation, each of the slave main devices always monitors a communication connection to the master main device, and determines that the original master main device malfunctions, when the communication connection with the master main device cannot be held for a predetermined time, and then one of the slave main devices, having a highest priority, substitutes for the original master main device to act as a new master main device; and in the second changeover operation, a main device specified by an ID is forcedly set to act as the master main device, wherein in the second changeover operation, a terminal is connected to one of the main devices and designates a main device in accordance with predetermined operation, and the main device designated by the terminal is forced to act as the new master main device, and wherein when the slave main device having acted as the original master main device recognizes connection from a terminal that is set to communicate with the original master main device according to a preset IP address, the slave main device redirects the connection from the terminal to the new master main device by transferring data from the terminal to the new master main device, and relaying data from the new master main device to the terminal.

16. The main device replacing method for the networking system according to claim 15, wherein, priorities are respectively set to the main devices, and a main device having a highest priority acts as the new master main device when the master main device malfunctions.

17. The main device replacing method for the networking system according to claim 16, wherein, one of the main devices compares a priority thereof with priorities of other main devices, and when the priority of the one of the main devices is higher than the priorities of the other main devices, the one of the main devices acts as the new master main device and issues a notification that the one of the main devices is the new master main device, and when each of the other main devices receives the notification, the main device recognizes that the main device itself is one of the slave main devices.

18. The main device replacing method of claim 15, comprising the further steps of:

synchronously transmitting latest system data to the slave master devices under control of the master main device; and when the master main device malfunctions, causing one of the slave main devices to substitute for the master main device to act as a new master main device.

* * * * *